US012561731B1

(12) United States Patent
Wright

(10) Patent No.: US 12,561,731 B1
(45) Date of Patent: Feb. 24, 2026

(54) MAPPING SYSTEMS AND METHODS FOR SHOPPING GUIDANCE

(71) Applicant: United Services Automobile Association (USAA), San Antonio, TX (US)

(72) Inventor: Susan Elizabeth Wright, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1031 days.

(21) Appl. No.: 17/380,966

(22) Filed: Jul. 20, 2021

Related U.S. Application Data

(60) Provisional application No. 63/058,133, filed on Jul. 29, 2020.

(51) Int. Cl.
| | |
|---|---|
| *G06Q 30/0601* | (2023.01) |
| *G01C 21/20* | (2006.01) |
| *G06F 3/14* | (2006.01) |
| *G06K 7/14* | (2006.01) |
| *G06Q 30/0283* | (2023.01) |
| *G06V 40/16* | (2022.01) |

(52) U.S. Cl.
CPC ....... *G06Q 30/0639* (2013.01); *G01C 21/206* (2013.01); *G06F 3/14* (2013.01); *G06K 7/1413* (2013.01); *G06K 7/1447* (2013.01); *G06Q 30/0283* (2013.01); *G06Q 30/0631* (2013.01); *G06V 40/172* (2022.01)

(58) Field of Classification Search
None
See application file for complete search history.

(56) References Cited

U.S. PATENT DOCUMENTS

| | | | | |
|---|---|---|---|---|
| 2012/0080517 A1* | 4/2012 | Braunstein | .............. | G07F 9/026 |
| | | | | 235/379 |
| 2014/0343846 A1* | 11/2014 | Goldman | ........... | G01C 21/1654 |
| | | | | 701/525 |
| 2015/0026010 A1* | 1/2015 | Ellison | ............... | G06Q 30/0641 |
| | | | | 705/26.41 |
| 2016/0259341 A1* | 9/2016 | High | ........................ | H04W 4/80 |
| 2020/0302510 A1* | 9/2020 | Chachek | ................ | G06V 20/52 |

OTHER PUBLICATIONS

Artificially Intelligent Navigation for Customers in Store; An IP.com Prior Art Database Technical Disclosure; Authors et. al.: Disclosed Without Attribution; IP.com No. IPCOM000254778D; IP.com Electronic Publication Date: Jul. 31, 2018 (Year: 2018).*

* cited by examiner

*Primary Examiner* — Michelle T Kringen
(74) *Attorney, Agent, or Firm* — Fletcher Yoder, P.C.

(57) ABSTRACT

A guidance system for efficiently providing a mapped path for a shopper in a store. The guidance system including one or more processors and one or more tangible, non-transitory, computer-readable media storing instructions, wherein the instructions, when executed by the one or more processors, cause the guidance system to analyze data indicative of a plurality of purchase items, map each purchase item of the plurality of purchase items to a respective purchase item location in a store to provide a mapping of the plurality of purchase items, determine a route through the store based on the mapping of the plurality of purchase items such that the route includes the respective purchase item locations, and provide a display of the route including a graphical indication of each of the respective purchase item locations via a graphical user interface of a computing device.

11 Claims, 6 Drawing Sheets

MAPPING SYSTEMS AND METHODS FOR SHOPPING GUIDANCE

CROSS-REFERENCE TO RELATED APPLICATION

The present application claims benefit of and priority to U.S. Provisional Patent Application Ser. No. 63/058,133, titled "MAPPING SYSTEMS AND METHODS FOR SHOPPING GUIDANCE," which was filed on Jul. 29, 2020, and which is herein incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Shopping in a store such as a large distribution center may be difficult due to time constraints, limited knowledge of locations of products in the store, and limited availability of store associates in helping a shopper find a location of a product in the store. Further, shopping in stores without knowledge of locations of products may result in an increased amount of time spent in the store, which may be undesirable. Indeed, these difficulties may lead to increased stress on the shopper and a decreased enjoy-ability of the shopping experience in the store.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
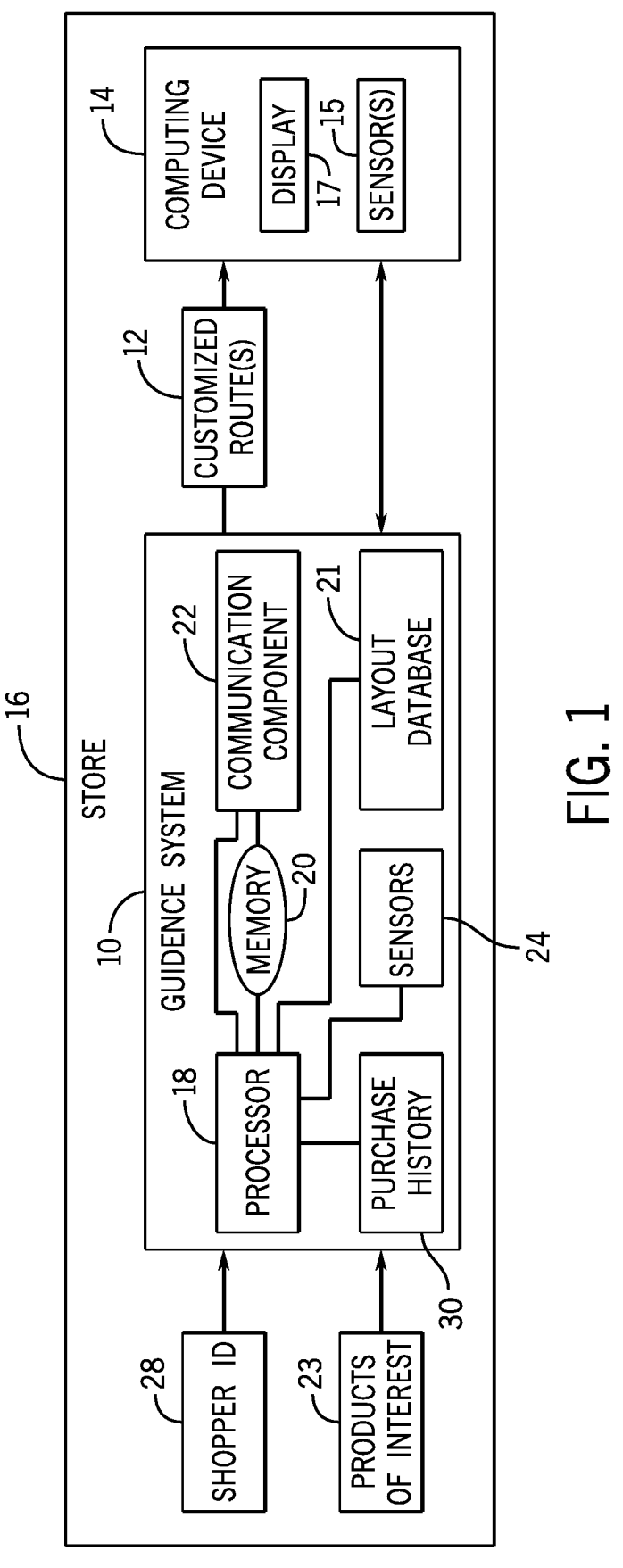
FIG. 1 is a block diagram of an embodiment of a guidance system for providing guidance to a shopper in a store, in accordance with embodiments described herein.

The present disclosure generally relates to mapping systems and methods for providing shopping guidance. More specifically, the present disclosure relates to determining and displaying paths for shoppers in a store.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

Present embodiments relate to systems and methods for providing shoppers customized routes in a store (e.g., a building, a structure, a marketplace, farmers market). The customized paths may include locations in the store for one or more respective products of interest. Specifically, a guidance system may map one or more locations of products of interest in the store and may provide the mapping to a shopper via a computing device (e.g., wireless device with Internet or cellular connectivity) associated with the shopper. Indeed, the guidance system may be communicatively coupled to the computing device via a network (e.g., a Wi-Fi network) and using a software application executing on the computing device that causes the computing device to display a graphical user interface containing a customized path and/or instructions for obtaining a product to purchase.

The customized path (e.g., customized route) may be determined based at least in part on a purchase history associated with a person (e.g., a shopper, individual, or entity) and a store layout. It should be noted that present embodiments may be employed by a person to transfer their shopping tasks to another person in an efficient manner. The purchase history may refer to a history of purchases (and returns) made by a person in one or more stores or on an online marketplace managed by an entity that manages the one or more stores. A store layout may refer to the one or more product locations in a store at a given time period. A single store may have multiple different layouts over time. Such layouts may be communicated to a guidance system in accordance with present embodiments by a store computing system or the guidance system may learn updated layouts based on user tracking data (e.g., crowd sourcing). A store layout may change on a seasonal, monthly, or even daily basis, depending on demands for one or more products in the store. Also, store layouts may change between stores associated with similar entities (e.g., stores within a grocery store chain). The customized path may also be determined based on indications received at the guidance system and from the computing device. Specifically, the application executing on the computing device may be configured to receive indication (e.g., via a touchscreen) of one or more products of interest. Such indications may be utilized by the guidance system in determining a customized route for the shopper.

Additional details with regard to a guidance system utilized to provide customized routes to a shopper in a store will be discussed in detailed below with reference to FIGS. 1-6.

By way of introduction, FIG. 1 is a block diagram of a guidance system 10 that provides customized routes 12 to computing devices 14 associated with shoppers in a store 16, in accordance with an embodiment of the present disclosure. Specifically, the guidance system 10 includes a processor 18, a memory 20 storing instructions that are executable by the processor 18, a communication component 22, and sensors 24. The instructions may include instructions to carry out one or more of the techniques disclosed herein. The processor 18 may be any type of computer processor or microprocessor capable of executing computer-executable code. The processor 18 may also include one or more processors (e.g., multiple processors) that may perform the operations described below.

In particular, the one or more processors, as represented by processor 18, may include multiple microprocessors, one or more "general-purpose" microprocessors, one or more special-purpose microprocessors, and/or one or more application specific integrated circuits (ASICs), or some combination thereof. For example, the one or more processors may include one or more reduced instruction set (RISC) processors.

The memory 20 may represent one or more memory devices that may store information such as control software, look up tables, product locations in a store, store layouts, configuration data, etc. In some embodiments, the processor 18 and/or the memory 20 may be external to the store 16. For example, cloud computing may be employed in accordance with present embodiments. The memory 20 may include a tangible, non-transitory, machine-readable-medium, such as a volatile memory (e.g., a random-access memory (RAM)) and/or a nonvolatile memory (e.g., a read-only memory (ROM)). The memory 20 may store a variety of information and may be used for various purposes. For example, the memory 20 may store machine-readable and/or processor-executable instructions (e.g., firmware or software) for the processor 18 to execute, such as instructions for determining customized routes for shoppers in a store. The memory 20 may also include one or more storage devices (e.g., non-volatile storage devices) that may include read-only memory (ROM), flash memory, a hard drive, or any other suitable optical, magnetic, or solid-state storage medium, or a combination thereof. As such, the memory 20 may be any suitable articles of manufacture that can serve as media to store processor-executable code, data, or the like. Also, one or more components of the guidance system 10 may operate and/or be physically located in a remote location (e.g., outside of the store).

The guidance system 10 may be configured to output customized routes 12 based on a store layout associated with the store at a first period of time. The store layout may refer to the distribution of products in the store. The store layout may include data indicative of the locations of the products in the store. The store layout may also include dimensions of the store, a number of aisles in the store, which aisles contain which products, which section of an aisle contains which product(s), a number of checkout counters in the store that are open, etc. The store layout may be dynamic and, thus, may change throughout different seasons or even in a given month or shorter timeframe (e.g., a day or during a store visit) to be consistent with various business interests and/or consumer demand. For instance, one or more products may be of high interest (e.g., high demand) during one season and as such the store layout may be configured to provide a large amount of space for the one or more products of high interest during the one season. In another season, the formally mentioned one or more products of high interest may be of low interest in the other season, and as such, the store layout may be configured to provide a smaller amount of space for the one or more products that are of low interest during the other season. Rearranging of products may occur daily and may even occur during a timeframe in which a shopper is visiting the store. Accordingly, in an embodiment of the present disclosure, the guidance system 10 may periodically check for updates to a store layout by, for example, checking with a layout database 21 that may be updated with relevant data by a system or person associated with the store. The guidance system 10 may also be updated based on user inputs and otherwise acquired data (e.g., a scan of an item by a user device in conjunction with a location of the user device at the time of the scan).

In the depicted embodiment, the guidance system 10 includes sensor(s) 24 that may be dispersed about the store 16. In particular, the sensors 24 may include infrared sensors, visible cameras, and/or other suitable sensors that may be configured to detect an amount of individuals in the store 16. The sensors 24 may also be configured to detect and/or determine an identity corresponding to a shopper or an authorizer via one or more facial recognition detectors, for example. The sensors 24 may also be configured to determine an amount of traffic in the store 16. It should be noted that the amount of traffic might not only be indicative of traffic from shoppers. Indeed, the amount of traffic may include non-human obstacles too. For example, an amount of traffic determined in the store 16 (or in a specific location in the store 16 such as in a specific aisle of the store 16) may include a number of shopper baskets in use or occupying a specific location in the store 16. Also, the amount of traffic determined may include factors such as inventory transport/carrier units occupying a section of the store 16 that is being restocked.

In the depicted embodiment, the guidance system 10 includes a communication component 22. The communication component 22 may be configured to cause the guidance system 10 to communicate (e.g., receive and transmit data packets) to one or more computing devices, such as a computing device 14 associated with a shopper. The communication component 22 may cause the guidance system 10 to send, on a wireless communication network, one or more data packets carrying instructions for displaying a graphical user interface that includes a customized route 12 on the computing device 14. The computing device 14 and the guidance system 10 may communicate via any suitable network such as a wireless network, a cellular network, a local area network (LAN) and/or a wireless local area network (WLAN). Other communication mediums may likewise be suitable.

The guidance system 10 may receive shopper identification data 28 corresponding to a shopper who enters the store 16 or an authorizer who authorizes a substitute shopper to obtain one or more products of interest in the store for the authorizer. The guidance system 10 may receive the shopper identification data 28 by analyzing data from the one or more sensors 24 (e.g., facial recognition data) and/or from computing devices 14 associated with shoppers who enter the store 16. For example, the guidance system 10 may include, in the memory 20, a list of member shoppers such as members of the store 16. The list may include identifiers (e.g., data indicative of facial features) corresponding to a shopper in the list or an authorized associate. The guidance system 10 may receive data from facial recognition sensors of the sensors 24, run the data against the list of member shoppers or authorized associates, and in response to a sufficient match of the data, access a purchase history 30 of the member shopper. In response to accessing the purchase history 30, the guidance system 10 may determine a customized route 12 in the store 16 based on the purchase history 30 (and the store layout, which may be accessed by the layout database 21).

Figure 2:
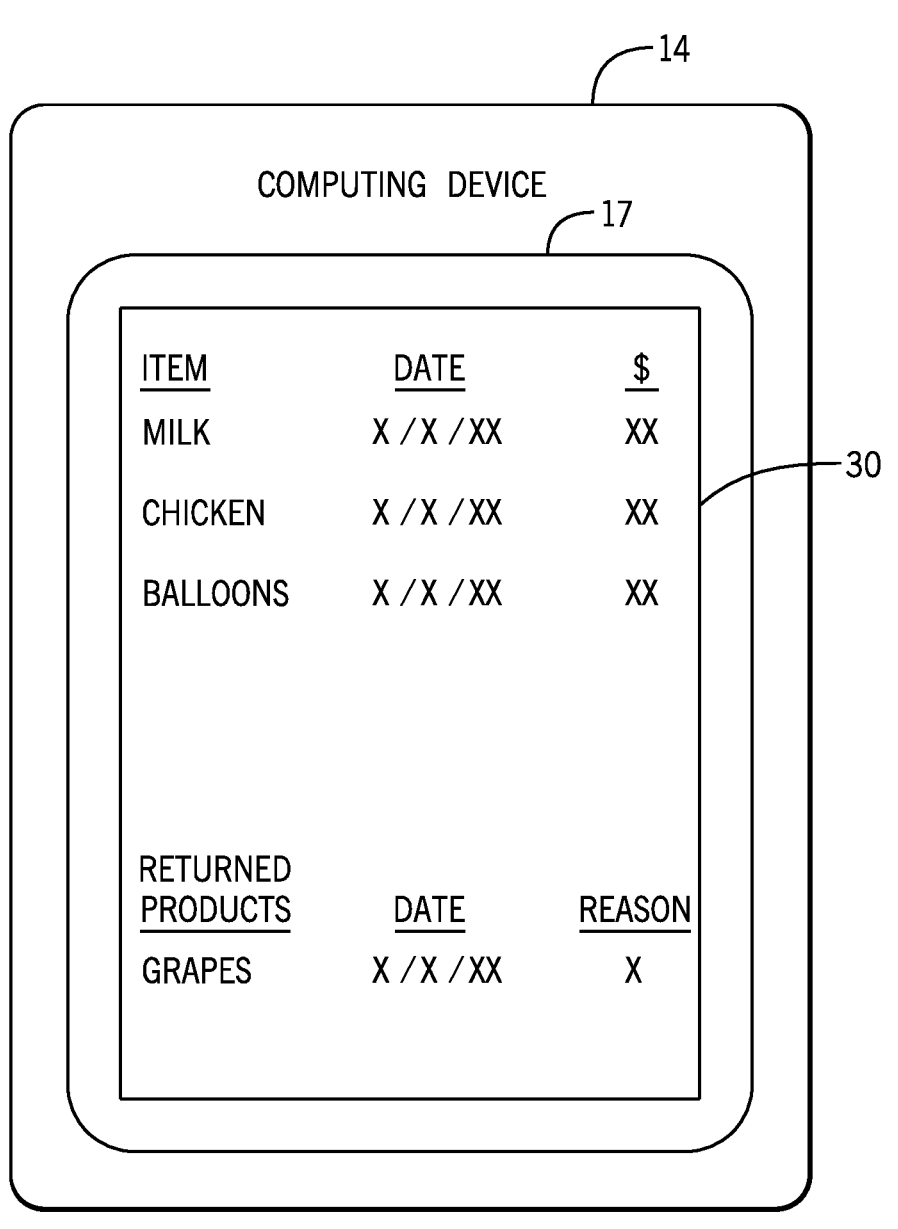
FIG. 2 is a schematic view of a graphical user interface on a computing device, wherein the graphical user interface is displaying a purchase history that is accessible by the guidance system of FIG. 1, in accordance with embodiments described herein.

FIG. 2 is a schematic representation of the computing device 14, in accordance with an embodiment of the present disclosure, with the display 17 (e.g., graphical user interface) displaying an example of data that may be stored as a purchase history 30, which may be accessed by the guidance system 10. In some embodiments, the purchase history 30 may be stored in one or more of various memories of various different systems. The guidance system 10 may immediately delete the purchase history 30 from a database or memory after use during the store visit.

In the illustrated embodiment, the purchase history 30 includes purchase items that were previously purchased (e.g., milk, chicken, balloons), the date in which the purchase items were purchased, and the cost of the purchase items. The purchase history 30 also includes returned items (e.g., items of disinterest), the date the returned items were returned, and the reason why the returned items were returned. In some embodiments, the purchase history 30 may be uploaded to the guidance system 10 in response to a shopper uploading a picture of a receipt of a purchase and/or a return. It should be noted that, in some embodiments, more or less information may be present on a purchase history 30 accessed by the guidance system 10. The guidance system 10 may directly maintain the purchase history 30 (e.g., based on cash register data) or import the purchase history from a separate device (e.g., the computing device 14, which may include a smart phone of a user). Also, it should be noted that in some embodiments, products of interest and purchase items may include the same products. Indeed, in some embodiments, a product of interest may also be a purchase item and/or a purchase item may be a product of interest.

Returning to FIG. 1, in some embodiments, the shopper identification data 28 may be received at the guidance system 10 from the computing device 14 associated with the shopper. As an example, the computing device 14 may send one or more data packets to the guidance system 10 indicative of a facial recognition confirmation (e.g., data generated by a local facial recognition package on the computing device 14), specific purchase history and/or purchaser, or desired products of interest 23. Such data may be sent to the guidance system 10 prior to, upon arrival, or after arrival at the store 16. As a security measure or to limit network traffic, present embodiments may require detection of the computing device 14 in the store before allowing interactions with the guidance system 10. When the purchase history 30 is stored on the computing device 14, an efficiency of computer operations (e.g., of the processor of the guidance system 10) may be achieved because the processor 18 may not need to retrieve the purchase history 30 from the memory 20 or another storage component in the guidance system 10. In addition, storing the purchase history 30 on the computing device 14 may increase a privacy of the shopper.

In some embodiments, the customized route 12 may correspond to a route of least traffic in the store 16 based on an amount of traffic in the store 16 at a specific time. In some embodiments, the customized route 12 may correspond to a fastest route, a route of least/limited distance traversed, and/or a route with the least or relatively reduced obstruction (e.g., limited relative traffic or obstacles). The guidance system 10, using real-time data indicative of an amount of obstacles or traffic in regions of the store (e.g., based on sensor data), may determine the customized route 12 that corresponds to a reduced or minimal amount of obstacles, traffic or required distance. For example, the sensors 24 (e.g., cameras) may detect indicators (e.g., QR codes, Radio Frequency Identification [RFID], or signal emitters) on carts, employees (e.g., ID badges) or other obstacles (e.g., boxes) and use such data to provide an indication of crowding in a particular area. In some embodiments, shape detection (e.g., detection of physical obstacles based on geometry) may be utilized for this purpose.

Further, shoppers may essentially self-report location data based on ongoing communication with their portable devices (e.g., the computing device 14) or based on scans of items using their portable devices. The guidance system 10 may automatically associate a user with a location based on scanning an item and a known location of the item. As another example, upon scanning an item, the computing device 14 (e.g., user device) may report location data acquired by local sensors 15 (e.g., GPS sensors). By employing scans of items and related transmission to trigger and assemble traffic data within the store 16, present embodiments provide efficient system and network communications by limiting traffic and efficiently coordinating supply of multiple different data types. In some embodiments, using such information about obstacles and foot traffic, the guidance system 10 may determine a customized route or routes 12 that correspond to the least or relatively limited traffic. This may include determining a plurality of routes and then comparing the determined plurality of routes to select one or more routes for provision to the user. The guidance system 10 may then send the customized route(s) 12 to a computing device 14 associated with the member shopper. The member shopper (or other user) may select, via the display 17 for example, a desired route of a plurality provided as the customized route(s) 12 or the user may only receive a single customized route 12. A notification comprising the customized route(s) 12 may be sent to the computing device 14 even when the computing device 14 (e.g., smart phone) is in a standby mode. The notification may be sent via a wireless transmission means such as text, email, and/or via a notification via a software application communicatively coupled to the guidance system 10 via the communication component 22.

Figure 3:
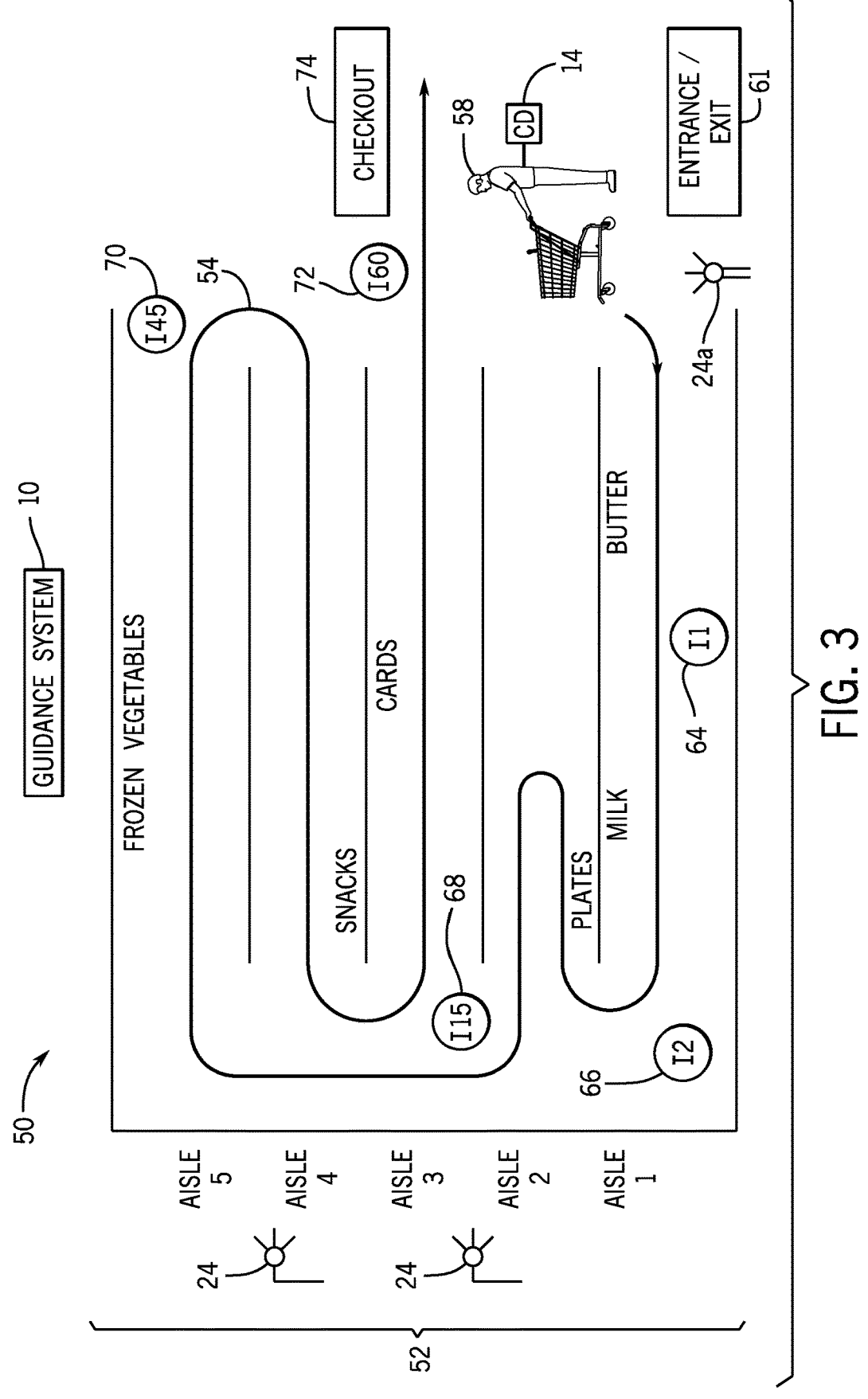
FIG. 3 is an overhead schematic view of a store including the guidance system of FIG. 1, wherein the guidance system has determined a customized path through the layout of the store, in accordance with embodiments described herein.

FIG. 3 is a schematic of a store 50 having a first store layout 52 and employing the guidance system 10 of FIG. 1, wherein the guidance system 10 has sent a customized route 54 to a computing device 14 associated with a shopper 58. As illustrated, the first store layout 52 includes products (e.g., items) located in a variety of locations (e.g., in aisles 1-5). The guidance system 10 may access data indicative of the store layout, which may include specific locations in which products of interest are located in the store 50. The guidance system 10 may map each of the plurality of products to a respective one or more product locations in the store to provide a mapping of the plurality of purchase products (e.g., products of interest). In some embodiments, when a product has more than one product location, the guidance system 10 may determine a product location that corresponds to a route with relatively limited or least traffic, required traversal time, obstruction, or a combination thereof. The guidance system 10 using the purchase history, the products of interest, the first store layout 52, and data from sensors 24 indicative of an amount of traffic in the store 50, congestion in particular areas, and so forth may determine a desirable path or route for the shopper to obtain each of the plurality of products of interest. The desirable route may be based on user-defined settings that indicate preferences (e.g., routing to avoid traffic, crowded spaces, obstructions, excessive time in the store). Such user-defined settings may be entered via a graphical user interface of the computing device 14 and communicated to the guidance system 10.

In the illustrated embodiment, a sensor 24a communicatively coupled to the guidance system 10 is located proximate to an entrance 61 of the store 50. The sensor 24a may be used to detect an amount of inflow and outflow through the entrance 61 of the store 50 and may be able to detect an identity of a shopper by capturing data useful for processing through facial recognition processing circuitry, for example. Such data may also be provided to the guidance system 10 directly from the computing device 14 (e.g., facial recognition or user authentication may be done locally and then confirmation provided to the guidance system 10). Other sensors 24 are also dispersed throughout the store 50. The sensors 24 may be configured to detect an amount of traffic in specific locations of the store 50.

The customized route 54 is represented in FIG. 3 as a route throughout the store 50. As an example, the customized route 54 represented in FIG. 3 has been arranged by the guidance system 10 for the shopper 58 to efficiently obtain sixty items based on user preferences for routing. Locations 64, 66, 68, 70, and 72 correspond to the respective locations of item no. 1, item no. 2, item no. 15, item no. 45, and item no. 60 of the sixty items. The customized route 54 is customized based on the locations of the products of interest of the shopper 58 and as such, may include points indicative of locations of purchase products that the shopper may desire to purchase based on the interest of the shopper. For example, by following the customized route 54, the shopper 58 may be able to obtain each item that the shopper 58 has indicated a desire to obtain via the computing device 14. After obtaining the items, the shopper may proceed to the checkout 74

Figure 4:
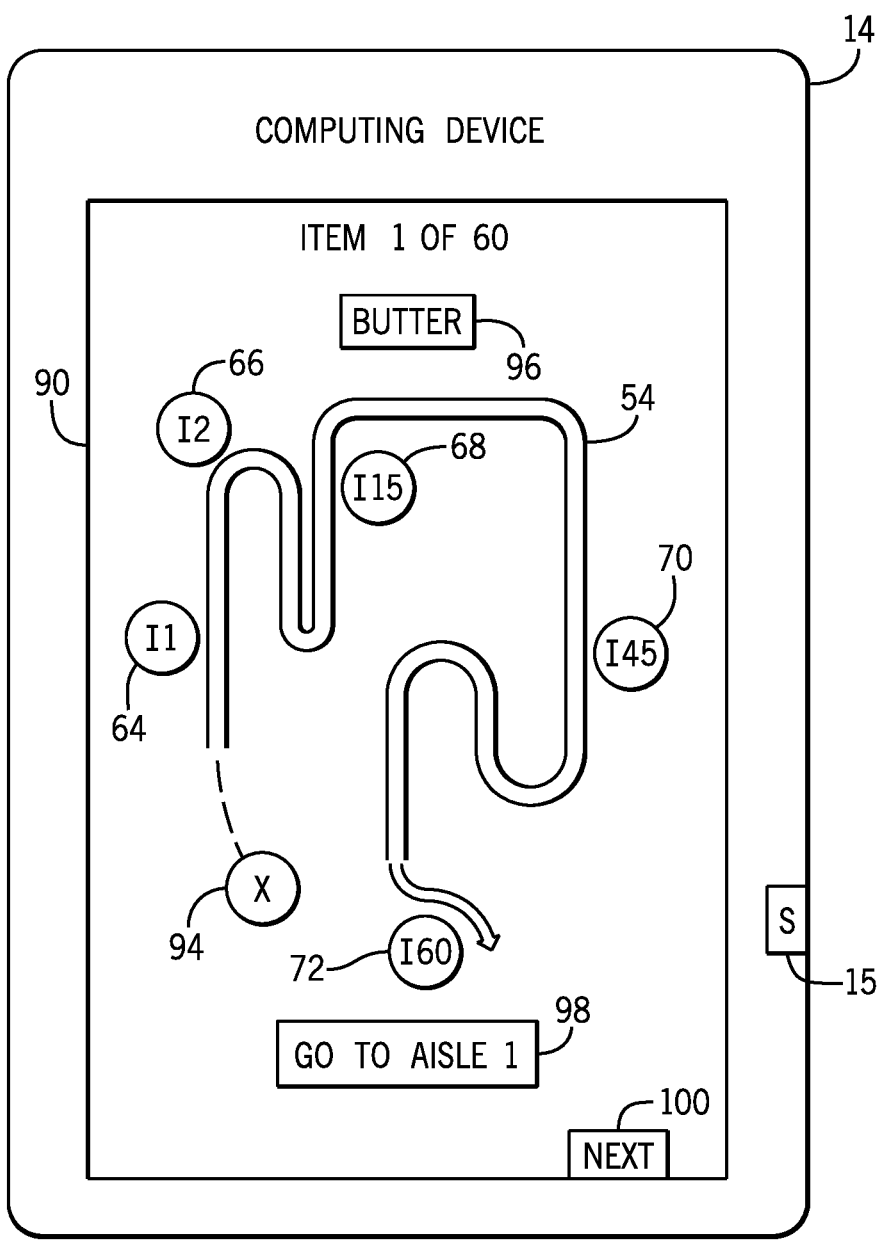
FIG. 4 is a schematic view of a computing device with a graphical user interface displaying the customized path of FIG. 3, in accordance with embodiments described herein.

Once the guidance system 10 (e.g., routing system) has determined/calculated the customized route 54, the routing system 10 may operate to send the customized route 54 to the computing device 14. FIG. 4 is an example of a graphical user interface (GUI) 90 executing on the computing device 14 by an application (e.g., a guidance application) on the computing device 14. Specifically, FIG. 4 includes the GUI 90 displaying a representation of the customized route 54 on the display 17 of the computing device 14. The GUI 90 operates to provide graphical indications of a location of the computing device 14 in the store 50, a graphical representation of the customized route 54, and the product locations corresponding to one or more products of interest. As illustrated, the GUI 90 indicates the product 96 (e.g., a product that should be approached first) that the shopper 58 should obtain and instructions 98 to get to the location 64, which is where the product 96 is located. An indication 100 to proceed to the next product is also displayed on the GUI 90. Data from a sensor 92 coupled to the computing device 14 may be used in deriving the graphical indication of the location 94 of the computing device 14. It should be noted that the product 96 and the indication 100 will change as progress along the customized route 54 is made. Further, the guidance system 10 may update the customized route 54 if the shopper 58 chooses to deviate from the initial version of the customized route 54.

Indeed, the computing device 14 may have location tracking enabled for the guidance system 10. The guidance system 10, via a guidance application executing on the computing device 14, may determine where the shopper 58 is located in the store 50 using the sensor 15, which may be a global positioning system (GPS) sensor. The guidance system 10 may correspond locations indicated by the sensor 15 with positions proximate to the customized route 54 sent to the computing device 14 for the shopper 58 to follow. In response to the shopper 58 straying from a particular location on the customized route 54 or deviating from the customized route 54 past a threshold value or percentage, an indication may be sent to the guidance system 10 indicating that the computing device 14 and the corresponding shopper 58 is outside of the customized route 54. Also, the guidance system 10 may notify the shopper 58 that the shopper 58 is outside of the customized route 54. For example, the computing device 14 may have a vibration system, and as such, the guidance system 10 may cause the guidance application operating on the computing device 14 to provide instructions to the computing device 14 to vibrate and to present an indication on the computing device 14 that the shopper 58 is outside of the customized route 54.

The shopper 58 may have received the customized route 54 at the computing device 14 in response to the guidance system 10 detecting an identification of the shopper 58 via the sensor 60 and/or via data packets transmitted to the guidance system 10 via the computing device 14 associated with the shopper 58. The guidance system 10 may have proceeded to notify the shopper 58, via the computing device 14, of an option to obtain a plurality of purchase products indicated on the purchase history. If the shopper indicates, via the computing device 14, an interest in obtaining the plurality of purchase products, then the guidance system 10 may have proceeded to determine the customized route 54 for the shopper 58 to proceed along through the store 50. The guidance system 10 may also send additional data to the computing device 14. For example, the guidance system 10 may be configured to receive data indicating that a particular item of the plurality of purchase items has a reduced price (or an alternate item that is related, such as a different brand of the same item type) and in response to the determination, may send, to the computing device 14, an indication indicative of the reduced price. In this way, the shopper 58 may have a more desirable experience at the store 50.

Also, an application (e.g., a guidance application) executing on the computing device 14 may allow the shopper 58 to review, via the GUI 90 or another GUI, a plurality of products (e.g., purchase products, products of interest) and select and/or confirm one or more of the plurality of products that the shopper 58 is interested in obtaining in the shopping session. Similarly, the shopper 58 may deselect or indicate disinterest in one or more of the plurality of purchase products on the purchase history. If the shopper 58 indicates, on the computing device 14, a disinterest in obtaining one or more of the plurality of purchase products indicated on the purchase history, then the customized route 54 may exclude the one or more locations of the one or more purchase products that the shopper 58 has indicated a disinterest in obtaining. If the shopper 58 has a purchase history accessible by the guidance system 10, it should be noted that some of the one or more of the products of interest may not be present in the purchase history. In this case, the shopper 58 may still indicate interest in the one or more products of interest. For example, the shopper 58 may input, into the computing device 14 (e.g., via text, selection of a graphical user interface element, type, voice), an indication of interest in a product. In response to the computing device 14 receiving a confirmation of the plurality of products that the shopper 58 desires to obtain, the guidance system 10 may determine the customized route for the shopper 58 based on the plurality of products of interest and on their locations in the store 50.

The guidance system 10 may also be configured to receive, via an input on the computing device 14, first additional data comprising indications of items of interest not on the purchase history. In response to obtaining the first additional data, the guidance system 10 may determine a customized route through the store 50 that includes one or more locations where one or more products in the first additional data are located. The guidance system 10 may also transmit second additional data to the computing device 14. For example, the guidance system 10 may be configured to determine that a particular product on a purchase history has a reduced price and, in response to that determination, send an indication to the computing device 14 that of the reduced price. In this way, the shopper may have a more desirable experience at the store 50.

Although in some embodiments, the guidance system 10 may store purchase histories corresponding to one or more shoppers and customized routes corresponding to those purchase histories in a database, store layouts may change. Similarly, stores of a same type but in different locations (e.g., different towns) may have slightly different layouts. In response to an update (e.g., a change) in a store layout of a store, the guidance system 10 may be configured to access the stored customized routes and modify the stored customized routes when the update regards an update to a respective one or more purchase item locations corresponding to one of the purchase items in the purchase histories and/or in the stored customized routes.

Some entities such as grocery store entities may have multiple locations (e.g., chains). A shopper may shop at a first location corresponding to a first store at a first period of time and then may shop at a second location corresponding to a second store associated with the same entity of the first store at a second period of time. It may be beneficial for the shopper to be identified in the second store by the guidance system employed in the second store and for the purchase history of the shopper to be accessed by the guidance system of the second store. As such, in some embodiments, the guidance system may be communicatively coupled to other guidance systems employed in different stores and/or in different store locations.

For example, a shopper who may typically shop at a first store associated with an entity may decide to shop at a second store associated with the entity. The second store may have a store layout different from the store layout of the first store. The guidance system 10 in the second store may identify the shopper (e.g., via one or more sensors) and may upload identification data of the shopper to a database that may be queried for a stored identification of the shopper. The database may be configured to be queried by guidance systems employed in different stores. If the shopper in the second store has a stored identification in the database, then the guidance system may determine a purchase history associated with the shopper. The guidance system may access the purchase history and, based on the store layout of the second store and on the purchase history, the guidance system may send a customized route to a computing device associated with the shopper.

In an embodiment of the present disclosure, the guidance system 10 may build routes based on data obtained from the computing device 14. Specifically, for example, the computing device 14 may report location and product information based on use of the computing device 14 to scan items, capture images, detect location and the like. Users may scan items as they are collected in a store to take them off of a dynamic shopping list (e.g., a GUI with listed items for purchase) provided on the computing device 14. This data may be crowd sourced from numerous different computing devices 14 to provide an ongoing and dynamic assembly of item types and location data. Discounts or coupons to specific items may be given to shoppers who scan items in order to encourage the shopper to participate in the crowdsource. By employing data acquired based on employment of the computing devices 14, the guidance system 10 may supplement exiting map data or it may generate new map data on an ongoing basis.

Figure 5:
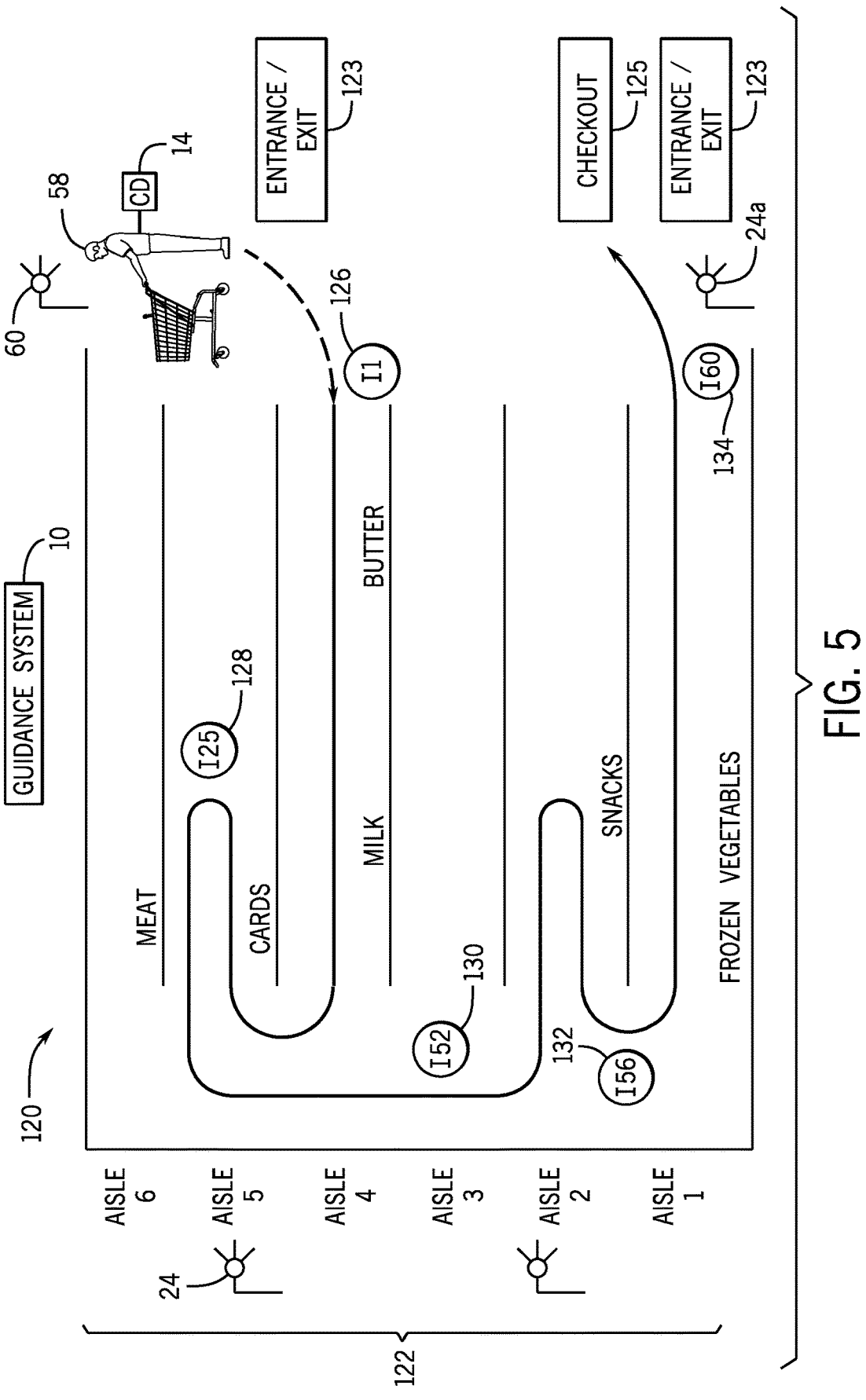
FIG. 5 is a schematic overhead view of a store including the guidance system of FIG. 1, wherein the guidance system has determined a customized path through the layout of the store, in accordance with embodiments described herein.

FIG. 5 is a schematic of a store 120 having a second store layout 122 and employing the guidance system 10 of FIG. 1, wherein the guidance system 10 has sent a customized route 124 to the computing device 14 associated with the shopper 58. The store includes six aisles. The shopper 58 may enter the store 120 via one of the entrances 123 and may checkout at the checkout 125. The shopper 58 may desire to purchase the same sixty items as indicated in FIGS. 3 and 4. However, since the store layout is different from the store layout of the store 50, the customized route 124 assembled by the guidance system 10 is different. The customized route 124 may also be different due to other factors, such as an amount of traffic in the store 120. The shopper 58 may enter the store 120, be identified by the sensor(s) 24 of FIG. 5, and receive, via the computing device 14, a customized route based on the purchase history of the shopper 58. In some embodiments, the shopper 58 may be able to send indications of products of interest to the guidance system 10 and receive the customized route 124 based on the sent indication of products of interest, rather than or in addition to, the purchase history. Locations 126, 128, 130, 132, and 134 correspond to the respective locations of item no. 1, item no. 25, item no. 52, item no. 14, and item no. 60 of the sixty items. The items may be associated with a different numbering as the item numbers of FIG. 3. The item numbers may correspond to an order in which the shopper may efficiently obtain the sixty items, which may be based on user-defined preferences. Similar to the GUI 90 of FIG. 4, a GUI displaying the customized route 124 may be sent to or provided by the computing device 14. Likewise, the GUI may have similar features as the GUI 90 of FIG. 4.

Furthermore, the guidance system 10 may be configured to send notifications indicative of recommendations to the computing device via the guidance application executing on the computing device 14. The guidance system 10 may be configured to receive an indication of interest in the recommended item from the shopper 58, via the computing device, and may determine an updated path including a location of the recommended item in the store 120. The recommendations may include recommended products. For example, the guidance system 10 may determine recommended items based on the purchase history of the shopper 58. The recommended products may be items that are not on a purchase history of the shopper 58. As an example, the recommended products may be a store brand of a purchase product associated with a third party on the purchase history or of a product of interest of the shopper 58.

Figure 6:
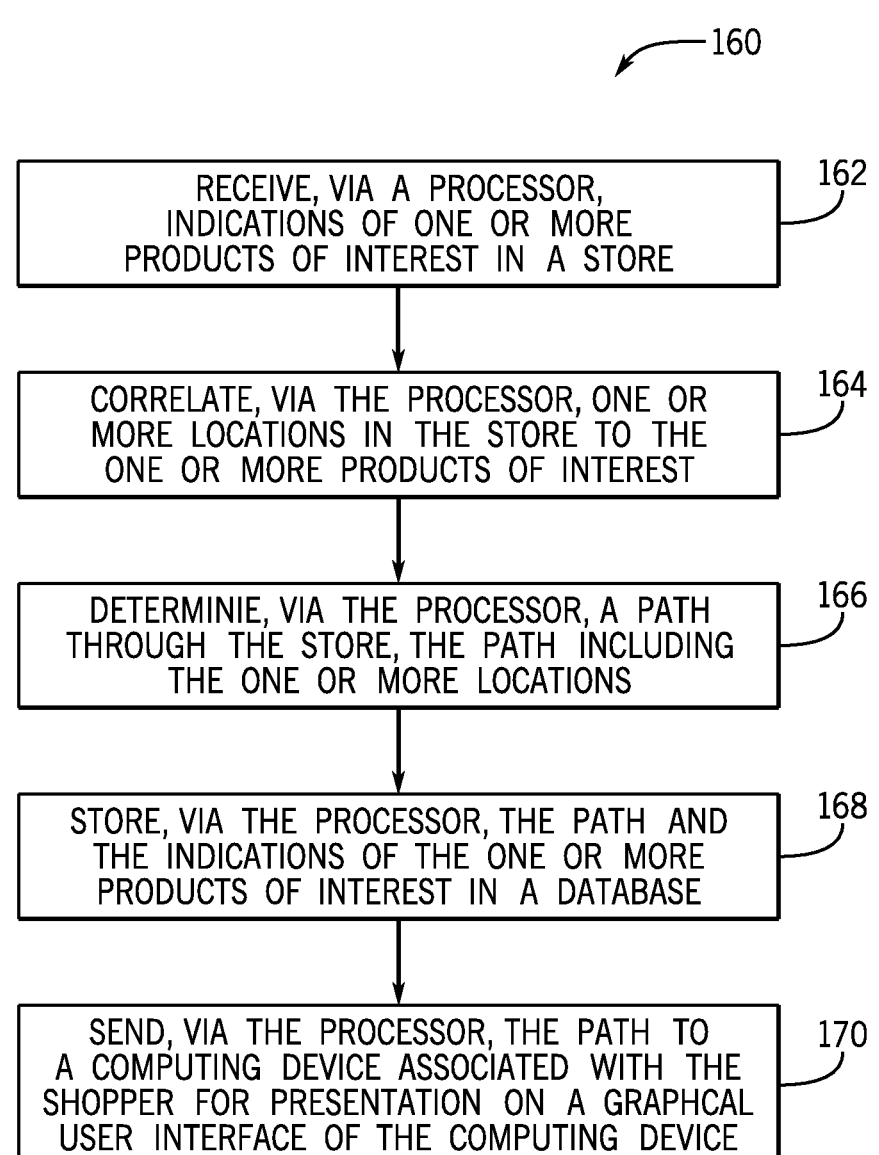
FIG. 6 is a flowchart of a method for determining a customized path through a store, in accordance with embodiments described herein.

FIG. 6 is an embodiment of a method 160 for determining a customized route through a store. The customized route includes locations corresponding to one or more products of interest. The method may be carried out by one or more components of the guidance system 10 of FIG. 1, for example. The method 160 begins with receiving (block 162), via a processor, indications of products of interest in the store. In some embodiments, the indications of products of interest may comprise captured imagery of the one or more products of interest in the store. For example, during an initialization period, the guidance system may receive captured imagery of one or more products of interest in the store. The captured imagery of the one or more products of interest may be received via a computing device associated with the shopper. For example, the shopper may scan a barcode corresponding to the products of interest and an application on the computing device may provide, to the guidance system, data indicative of the products of interest.

The method 160 continues with correlating (block 164), via the processor, one or more locations in the store to one or more products of interest. At this step, the locations of the one or more products of interest in the store may be determined. If a product of interest such as a brand of a specific product of interest is not available, then the method 160 may include determining a location of a substitute brand at this step. Further, this step may include accessing data indicative of a store layout having indications of one or more products of interest in one or more particular locations in the store. Such data may be used in correlating the one or more locations in the store to the one or more products of interest.

In response to correlating one or more locations of the one or more products of interest, the method 160 continues with determining (block 166), via the processor, a path (e.g., a customized route, customized mapped route) through the store, the path including the one or more locations in the store. The path may comprise a graphic with imagery of the one or more products of interest respectively positioned proximate to portions of the path corresponding to the one or more locations. It should be noted that the one or more locations in the store may even correspond to locations that are outside of a ventilated area of the store. Indeed, in some stores, some products are located at or near an entrance or portal outside of a structure. Furthermore, the route may take entrances, checkout areas, and exits into account.

The method 160 continues with storing (block 168), via the processor, the path and the captured imagery in a database. The path and the captured imagery may be stored on a computing device corresponding to a shopper or in a central location associated with an entity that manages the store.

The method 160 further continues with sending (block 170), via the processor, the path to a computing device associated with the shopper for presentation on a graphical user interface of the computing device. The path may be sent in response to the processor receiving a request for the path. The computing device may receive the path and a guidance application executing on the computing device may begin tracking the location of the computing device in the store.

In some embodiments, the method 160 may proceed with modifying the path in response to receiving one or more updated locations of the one or more products of interest in the store. In these embodiments, the one or more updated locations may be indicated by a computing system associated with an entity that manages a store layout. In other embodiments, the method 160 may proceed with modifying the path in response to receiving, via the computing device, input indicative of a disinterest in a particular product of the one or more products of interest.

As mentioned earlier, in some embodiments, the shopper may be a substitute shopper. That is, a first individual may authorize a second individual to shop for the first individual. In some cases, the substitute shopper may be required to initiate or provide video and/or audio feedback to an authorizer for one or more particular items, such as produce. The substitute shopper may send, via a computing device associated with the substitute shopper, an image of a product of interest available at the store. The image may be sent to a second computing device associated with an authorizer who may not be physically present in the store. Based on an indication of interest in the product of interest, the computing device may be configured to receive and transmit an indication of approval or disapproval of the product of interest to the computing device associated with the substitute shopper or to the processor (e.g., the processor 18 of the guidance system 10 of FIG. 1).

Present embodiments operate to assemble guidance or routing data (e.g., a map provided on a GUI) for shopping experiences. The data utilized by present embodiments may be generated by store management (e.g., a database with product locations and a store layout may be provided) or assembled based on input from one or more user devices. As an example of the latter, an application running on a portable device (e.g., a smart phone) may operate to scan items for purchase or otherwise capture identification information for items for purchase (e.g., capture an image of the item) and then correlate that information with a location of the portable device at the time of scanning/capture. This data may be used to then assemble location information for a series of products and piece together aspects of a store layout without requiring additional information. Further, data assembled based on data acquisition/provision by the portable device may also be used to supplement existing layout information (e.g., data provided by a store regarding its layout and/or product placement). Thus, present embodiments provide computational efficiencies by distributing tasks and assembling data in an overlapping manner (e.g., processing both item acquisition for purchase and location data in conjunction). Further, using such operational features, present embodiments may facilitate shopping experiences for individuals in various different situations. For example, an individual doing their own shopping may be able to do so more efficiently or in a manner that addresses shopping preferences based on routing information provided by the guidance system. As another example, an individual that is doing shopping for another individual or that is in an unfamiliar store and that is unfamiliar with locations of items on a purchase list may be guided by the guidance system in a manner that avoid inefficiency. Present embodiments may also authenticate users and manage historical data to provide guidance and authentication in an efficient manner.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A guidance system for efficiently providing a mapped path for a shopper in a store, the guidance system comprising:

one or more processors and one or more tangible, non-transitory, computer-readable media storing instructions, wherein the instructions, when executed by the one or more processors, cause the guidance system to:

cause the guidance system to identify facial recognition data corresponding to the shopper via a facial recognition system in response to the shopper entering the store;

retrieve a plurality of purchase items from a computing device or a database on the guidance system based on a correlation of the plurality of purchase items to the facial recognition data corresponding to the shopper;

analyze location data corresponding to the plurality of purchase items;

based on the location data, map each purchase item of the plurality of purchase items to a respective purchase item location in the store to provide a mapping of the plurality of purchase items;

identify a purchase item of the plurality of purchase items with a first product location and a second product location in the store;

determine a first route through the store based on the mapping of the plurality of purchase items such that the first route includes the respective purchase item, wherein the first route includes the first product location of the purchase item;

determine a second route through the store based on the mapping of the plurality of purchase items such that the second route includes the respective purchase item, wherein the second route includes the second product location of the purchase item;

select the first route based on the first route having less obstacles than the second route; and provide a display of the first route including a graphical indication of each of the respective purchase item locations via a graphical user interface of the computing device.

2. The guidance system of claim 1, wherein the instructions, when executed by the one or more processors, cause the guidance system to provide an additional display of a purchase history of previously purchased purchase items and additional purchase items indicated as of interest.

3. The guidance system of claim 1, wherein the instructions, when executed by the one or more processors, cause the guidance system to identify a location of the computing device and send an updated route in response to the location of the computing device being outside of the first route or in response to receiving an input from the computing device indicating dismissal of one of the plurality of purchase items.

4. The guidance system of claim 1, wherein the instructions, when executed by the one or more processors, cause the guidance system to:

determine that a particular purchase item of the plurality of purchase items was returned to the store or an entity associated with the store; and indicate that the particular purchase item was returned in a particular graphical indication for the particular purchase item.

5. The guidance system of claim 1, wherein the instructions, when executed by the one or more processors, cause the guidance system to assemble location data from a plurality of computing devices to define the mapping.

6. The guidance system of claim 5, wherein the instructions, when executed by the one or more processors, cause the guidance system to obtain the location data from the plurality of computing devices in conjunction with data scanned by the plurality of computing devices.

7. The guidance system of claim 1, wherein the store is associated with a first store layout and an entity, and wherein the instructions, when executed by the one or more processors, cause the guidance system to:

identify the shopper in a second store associated with the entity, the second store having an associated second store layout; and based on the second store layout and the location data indicative of the plurality of purchase items, send an updated route to the computing device.

8. The guidance system of claim 1, wherein the instructions, when executed by the one or more processors, cause the guidance system to determine the first route and the second route based on determining an amount of traffic at one or more locations in the store.

9. The guidance system of claim 1, wherein the instructions, when executed by the one or more processors, cause the guidance system to:

determine that a particular item of the plurality of purchase items has a reduced price; and send an indication indicative of the reduced price to the computing device.

10. The guidance system of claim 1, wherein the instructions, when executed by the one or more processors, cause the guidance system to:

send a recommended item to the computing device based on the plurality of purchase items, the recommended item not being included in the plurality of purchase items;

receive an indication of interest in the recommended item from the computing device; and include a location of the recommended item in the first route.

11. The guidance system of claim 1, wherein the instructions, when executed by the one or more processors, cause the guidance system to:

determine a plurality of routes, including the first route, through the store based on the mapping of the plurality of purchase items such that each route of the plurality of routes includes the respective purchase item locations;

present the plurality of routes via the graphical user interface of the computing device; and determine the first route based on receiving a selection of the first route from among the plurality of routes via the graphical user interface.

* * * * *